United States Patent [19]
Bellamy et al.

[11] Patent Number: 6,012,710
[45] Date of Patent: Jan. 11, 2000

[54] HYDRAULIC ANTIVIBRATION SUPPORT

[75] Inventors: Alain Bellamy, Naveil; Denis Reh, Thiville, both of France

[73] Assignee: Hutchinson, Paris, France

[21] Appl. No.: 09/122,924

[22] Filed: Jul. 27, 1998

[30] Foreign Application Priority Data

Aug. 1, 1997 [FR] France ................... 97 09879

[51] Int. Cl.$^7$ .................................................. F16F 13/00
[52] U.S. Cl. ................... 267/140.13; 267/140.12; 267/219
[58] Field of Search .............. 267/140.11, 140.12, 267/140.13, 219, 140.14, 292, 293, 294, 152, 153, 220, 35; 180/300, 312, 902; 248/636, 562, 638, 634; 277/634, 635, 637, 645, 412, 353, 402, 549, 648

[56] References Cited

U.S. PATENT DOCUMENTS

| | | | |
|---|---|---|---|
| 4,679,777 | 7/1987 | Gold et al. | 267/140.13 |
| 5,556,071 | 9/1996 | Bellamy et al. | 248/634 |
| 5,741,001 | 4/1998 | Bellamy et al. | 248/634 |

FOREIGN PATENT DOCUMENTS

| | | |
|---|---|---|
| 0 342 680 | 11/1989 | European Pat. Off. . |
| 0 646 735 | 4/1995 | European Pat. Off. . |
| 0 709 594 | 5/1996 | European Pat. Off. . |
| 05272584 | 10/1993 | Japan . |
| 07269638 | 10/1995 | Japan . |
| 07269639 | 10/1995 | Japan . |
| 2 211 270 | 6/1989 | United Kingdom . |

OTHER PUBLICATIONS

French Preliminary Search Report dated May 13, 1998, French Application FR 9709879.

*Primary Examiner*—Douglas C. Butler
*Attorney, Agent, or Firm*—Marshall, O'Toole, Gerstein, Murray & Borun

[57] ABSTRACT

A hydraulic antivibration support has a strength member connected to a plate by an elastomer body whose base is pressed against the plate to define two hydraulic chambers and a narrow channel, all filled with liquid. The base of the elastomer body has two opposite sides that are crimped onto the plate and two free sides that are not crimped, each of the free sides having a projecting peripheral sealing lip which is compressed against the plate and which is of asymmetrical profile that is not perpendicular to the support face of the plate, being inclined throughout in the same direction relative to the support face.

9 Claims, 3 Drawing Sheets

HYDRAULIC ANTIVIBRATION SUPPORT

FIELD OF THE INVENTION

The present invention relates to hydraulic antivibration supports.

More particularly, the invention relates to a hydraulic antivibration support designed to be interposed between two rigid elements to damp vibration between these two elements essentially along a first axis, the support comprising:

first and second rigid strength members suitable for securing respectively to the two rigid elements to be united, the second strength member being constituted by a plate which extends in a mean plane perpendicular to the first axis and which has a "support" face facing towards the first strength member;

an elastomer body connecting the first strength member to the plate and having a base pressed in sealing contact against the support face of the plate merely by being clamped parallel to the first axis, said axial clamping being obtained by means of a rigid perforated insert which is embedded in the base of the elastomer body and which is held pressed against the support face of the plate by crimping, the base of the elastomer body having at its periphery firstly at least two opposite "fixing" edges along which said crimping is performed, and secondly at least two free edges interconnecting the fixing edges, the perforated insert itself having free edges which are embedded in the free edges of the base of the elastomer body and which are merely pressed axially against the support face of the plate, the elastomer body further comprising a bell-shaped thick wall which extends along the first axis which flares to the base of said elastomer body from a top secured to the first strength member and which co-operates with the support face of the plate to define at least a first hydraulic chamber filled with liquid;

a deformable second hydraulic chamber also filled with liquid; and a narrow channel which is filled with liquid, and which interconnects the first and second hydraulic chambers.

BACKGROUND OF THE INVENTION

Document EP-A-0 646 735 describes an example of a hydraulic antivibration support of the above-specified type.

OBJECTS AND SUMMARY OF THE INVENTION

A particular object of the present invention is to improve that known support so as to improve its sealing, particularly via the free edges of the base of the elastomer body.

To this end, according to the invention, in a hydraulic antivibration support of the kind in question the base of the elastomer body has, at its periphery and at least along each of said free edges, an outer sealing lip made of elastomer projecting towards the plate and which is at least partially compressed against the support face of said plate, said outer sealing lip having a profile that is asymmetrical and not perpendicular to the support face of the plate, said profile sloping throughout in the same direction relative to said support face of the plate.

By means of these dispositions, the peripheral sealing lip does not change its direction of inclination relative to the support face of the plate, even after small relative movements which can take place between the plate and the free edges of the base of the elastomer body, thereby guaranteeing continuous sealing contact between said free edges and the plate, while avoiding any risk of leakage via said free edges.

Conversely, experience has shown the inventors of the present invention that by giving the free edges of the base of the elastomer body a simple axial sealing rib of conventional design (i.e. a rib whose profile is parallel to the first axis), not only does the rib not improve sealing of the antivibration support, but indeed it runs the risk of giving rise to additional leakage.

Such an axial rib tilts down randomly to one side or the other under the combined effects of the axial clamping of the base of the elastomer body against the plate and of small relative movements that can take place between the plate and the free edges of the base of the elastomer body, and it turns out that the zones having changes in the inclination of the rib relative to the support face of the plate lend themselves to leaks, in spite of the above-mentioned clamping of the base of the elastomer body against the plate.

In preferred embodiments of the invention, use may optionally be made of one or more of the following dispositions:

the profile of the peripheral sealing lip is inclined to flare outwards towards the support face of the plate;

each outer sealing lip is in the form of a solid bead of elastomer having an asymmetrical V-shaped profile with an inner bearing face which flares outwards towards the support face of the plate and which is compressed against said support face of the plate, and an outer side face which is substantially perpendicular to the mean plane of the plate;

the support face of the plate has a raised central portion which projects towards the elastomer body and which lies between sloping edges flaring outwards going away from the first strength member, in correspondence with the free edges of the base of the elastomer body, the bearing faces of the outer sealing lips pressing respectively against the sloping edges;

the support face of the plate further comprises plane outer surfaces which are disposed outside said sloping edges and which extend parallel to the mean plane of the plate, each of the bearing faces of the outer sealing lips having a plane outer zone which extends parallel to the corresponding plane outer surface of the plate and which presses against said plane outer surface;

the elastomer body also has a freely-deformable thin wall which co-operates with the support face of the plate to define the second hydraulic chamber, the narrow channel itself being defined between the base of the elastomer body and said support face of the plate;

the base of the elastomer body further has at least one intermediate sealing lip which projects towards the plate and which is compressed at least in part against the support face of said plate, thereby isolating the working chamber, the compensation chamber, and the narrow channel from one another apart from the communication between the narrow channel and said chambers;

the base of the elastomer body has two parallel intermediate sealing lips spaced apart from each other between the working chamber and the compensation chamber;

each of the fixing edges of the base of the elastomer body has an elastomer bead which projects towards the plate and which is at least partially compressed against the support face of said plate, the beads which correspond to the various fixing edges connecting to the various sealing lips, thereby forming a peripheral sealing barrier around the entire perimeter of the base of the elastomer body;

the antivibration support further includes a rigid cover which covers the thick wall of the elastomer body at least in part so as to limit movement of the first strength member relative to the plate, said cover having fixing zones extending parallel to the plate and secured to said plate in the vicinity of the free edges of the base of the elastomer body, said free edges of the perforated insert and of the base of the elastomer body being clamped parallel to the first axis between the support face of the plate and said cover; and the base of the elastomer body has two fixing edges that are interconnected by two free edges, the cover being generally Ω-shaped and open on a second axis perpendicular to said first axis, with the two fixing flanges forming said fixing zones, and the first strength member being in the form of an elongate rigid member extending longitudinally along said second axis.

BRIEF DESCRIPTION OF THE DRAWINGS

Other characteristics and advantages of the invention appear from the following description of an embodiment given by way of non-limiting example, and with reference to the accompanying drawings.

In the drawings.

MORE DETAILED DESCRIPTION

In the various figures, the same references designate elements that are identical or similar.

Figure 2:
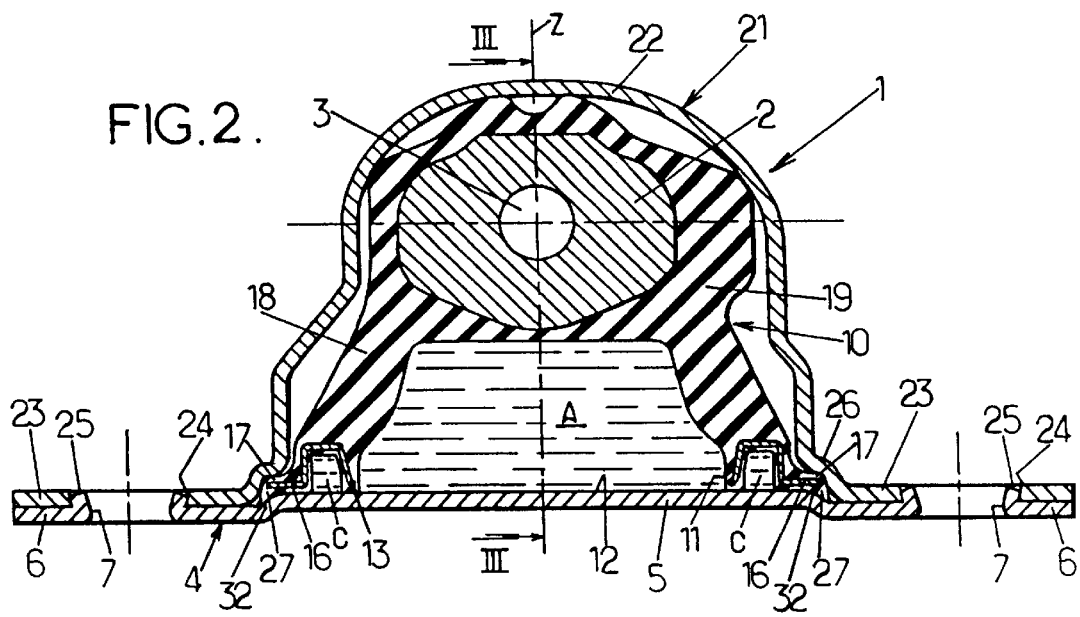
FIG. 2 is a section view on line II—II of FIG. 1.
Figure 1:
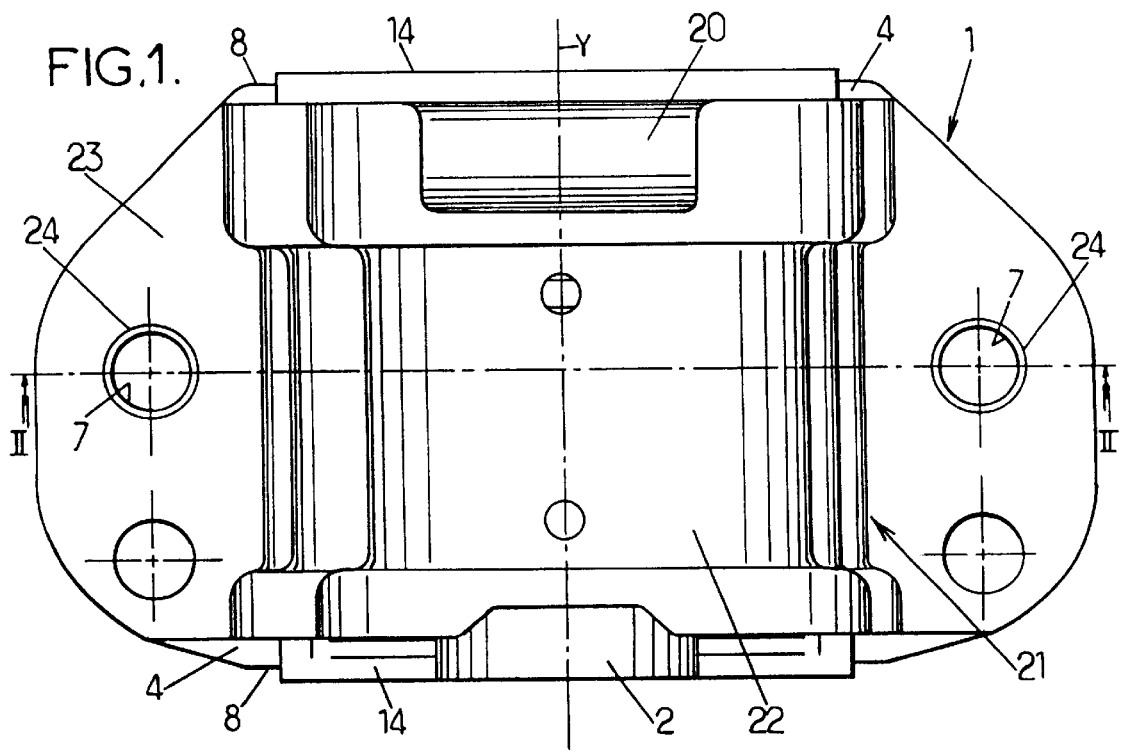
FIG. 1 is a plan view of a hydraulic antivibration support constituting an embodiment of the invention.
Figure 3:
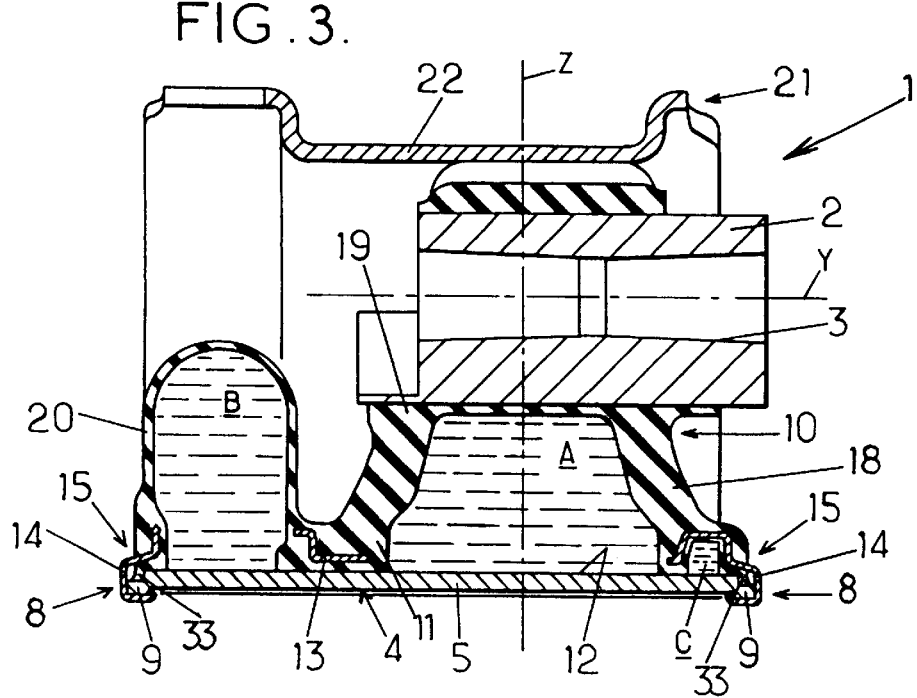
FIG. 3 is a section view on line III—III of FIG. 2.

The hydraulic antivibration support 1 shown in FIGS. 1 to 3 is designed to be interposed between two rigid elements such as the structure and the power unit of a vehicle, for the purpose of supporting the power unit and of damping and filtering vibration between those two elements, essentially along a vertical axis Z.

The antivibration support comprises firstly a first rigid strength member 2 in the form of an elongate metal member extending along an axis Y perpendicular to the axis Z and pierced by a central hole 3 enabling it to be fixed to the power unit of the vehicle, for example.

This first strength member 2 is disposed above a second rigid strength member 4 in the form of a metal plate that is substantially plane in general shape, extending perpendicularly to the axis Z, i.e. horizontally.

The plate 4 has a stamped central portion 5 that is plane in shape, and that is slightly raised relative to two fixing flanges 6 at opposite ends of said central portion.

Each of the flanges 6 is provided with at least one fixing hole 7 designed to fix the plate 4 to the structure of the vehicle.

Naturally, the plate 4 could be fixed to the power unit and the strength member 2 to the structure, in which case the strength member 2 would be situated beneath the plate 4, and the overall disposition of the antivibration support would then be upside-down relative to the disposition shown in the drawings.

In addition, the plate 4 has two lateral edges 8 each extending between the two fixing flanges 6 and forming respective rims or margins 9 that are offset downwards relative to the central portion 5.

Also, the plate 4 is connected to the strength member 2 by an elastomer body 10 which is molded as a single piece and which has a base 11 pressed in sealed manner against the support or top face 12 of the plate 4, merely by axial clamping parallel to the axis Z.

This axial clamping is obtained by crimping a perforated and stamped rigid metal insert 13 which is generally made of steel and which is embedded in the base 11 of the elastomer body.

More particularly, the perforated insert 13 has two side tabs 14 which project outwards from two opposite edges 15 of the base of the elastomer body, which extend along the length of the rims 9, and which are crimped to said rims 9.

In addition, the tabs 14 of the perforated insert 13 are connected to each other by two opposite edges 16 of said insert, which edges together with the tabs 14 form the periphery of the perforated insert, with each edge constituting a plane margin parallel to the plane of the plate 4.

These two free edges 16 are embedded in the base 11 of the elastomer body, thereby likewise forming two free edges 17 corresponding to the edges 16, said free edges 16, 17 being merely pressed axially against the top face 12 of the plate, without crimping.

The elastomer body 10 also has a bell-shaped thick wall 18 having sufficient compression strength to support the power unit. This wall 18 flares downwards from a top 19 bonded to the strength member 2 to the base 11 of the elastomer body, co-operating with the top face 12 of the plate to define a working chamber A which is filled with liquid.

In addition, the elastomer body 10 also forms a flexible membrane 20 that is likewise bell-shaped, that is freely deformable, and that co-operates with the top face 12 of the plate to define a compensation chamber B which is also filled with liquid.

The two chambers A and 9 are thus juxtaposed in non-concentric manner on the top face 12 of the plate, and these two chambers may, for example, be substantially in alignment on the axis Y.

Furthermore, the two chambers A and B communicate with each other via a narrow channel C which is defined between the top face 12 of the plate and a groove formed in the base 11 of the elastomer body, the shape of the groove being preferably defined by stamping the perforated insert 13.

The narrow channel C thus enables liquid to be transferred between the chambers A and B for the purpose of damping vibration between the strength member 2 and the plate 4, essentially along the axis Z.

Finally, to limit displacement of the strength member 2 relative to the plate 4, the antivibration support also includes a rigid metal cover 21 which is a section member of substantially Ω-shaped section having two open axial faces extending perpendicularly to the axis Y.

The cover 21 has a central portion 22 capable of co-operating with projections on the elastomer body by coming into abutment therewith, and it extends between two horizontal flanges 23 which rest on the fixing flanges 6 of the plate.

These flanges 23 have respective fixing holes 24 in register with the fixing holes 7 of the flanges 6 so that the plate 4 and the cover 21 can be fixed together by being screwed to the structure of the vehicle.

In addition, the flanges 23 and 6 are advantageously also fixed to each other by crimping.

By way of example, the crimping can be performed by flaring portions 25 of the plate 4 through the holes 24 in the flanges of the cover, in which case the holes are frustoconically shaped, flaring upwards.

Figure 4:
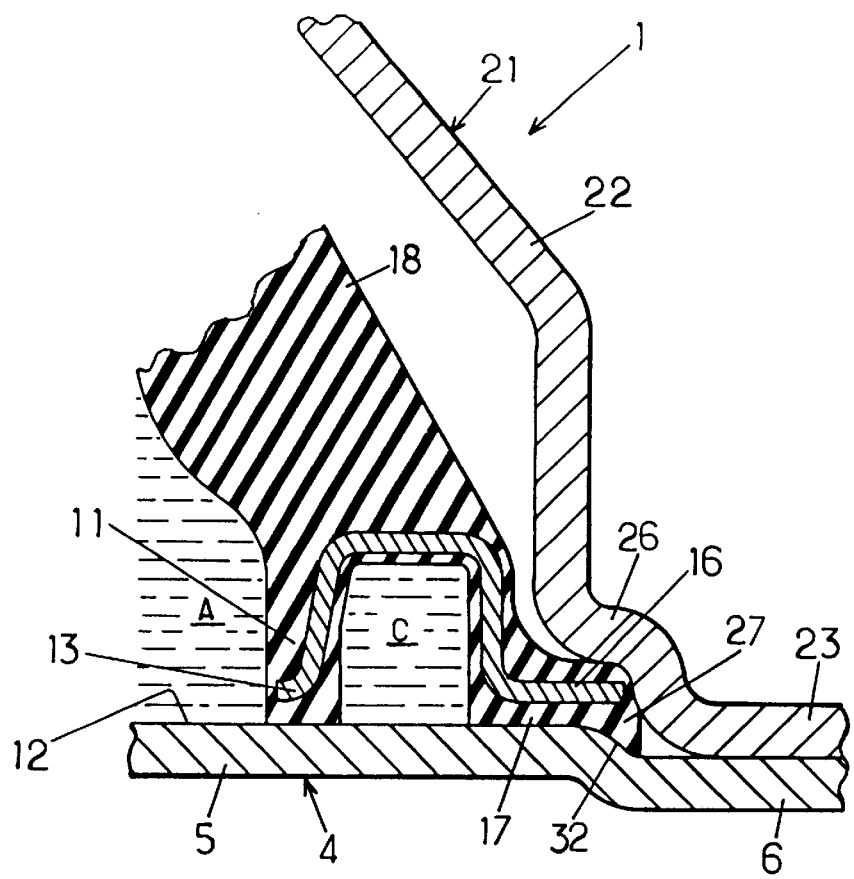
FIG. 4 is a detail view of FIG. 2.

Finally, as shown in FIG. 4, between its central portion 22 and each of its flanges 23, the cover also has a step 26 forming a bearing zone which presses parallel to the axis Z against the free edges 16 and 17 of the perforated insert and the base of the elastomer body, thereby pressing said free edges against the top face 12 of the plate.

This guarantees that the free edges 16 and 17 are pressed against the plate 4 with a determined amount of force, thereby avoiding any leakage of liquid between said plate and the base of the elastomer body via said free edges 16, 17.

Figure 5:
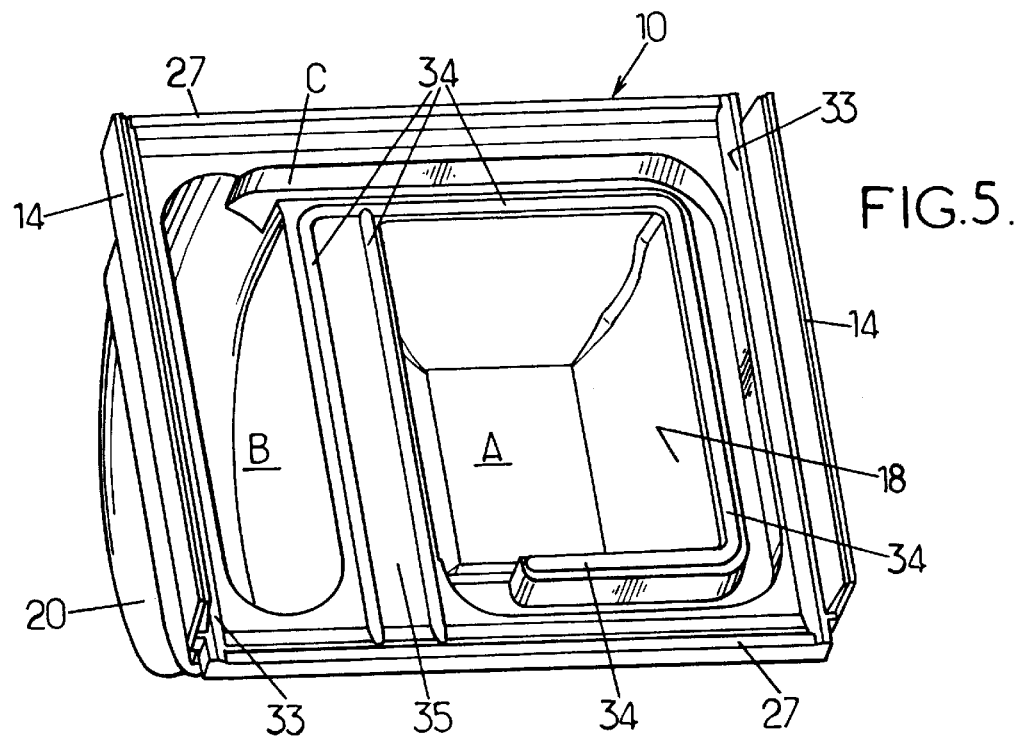
FIG. 5 is a view from beneath and in perspective of the elastomer body belonging to the antivibration support of FIGS. 1 to 6.

This absence of leakage is further guaranteed by the presence of two external sealing lips 27 which can clearly be seen in FIG. 5, each extending along one of the free edges 15 of the base of the elastomer body, on the bottom face of the base.

In order to prevent the sealing lip suffering from changes in its direction of inclination relative to the top face 12 of the plate, each lip 27 is asymmetrical in profile and non-perpendicular relative to the top face 12 of the plate, said profile being inclined throughout in the same direction relative to said top face.

Figure 6:
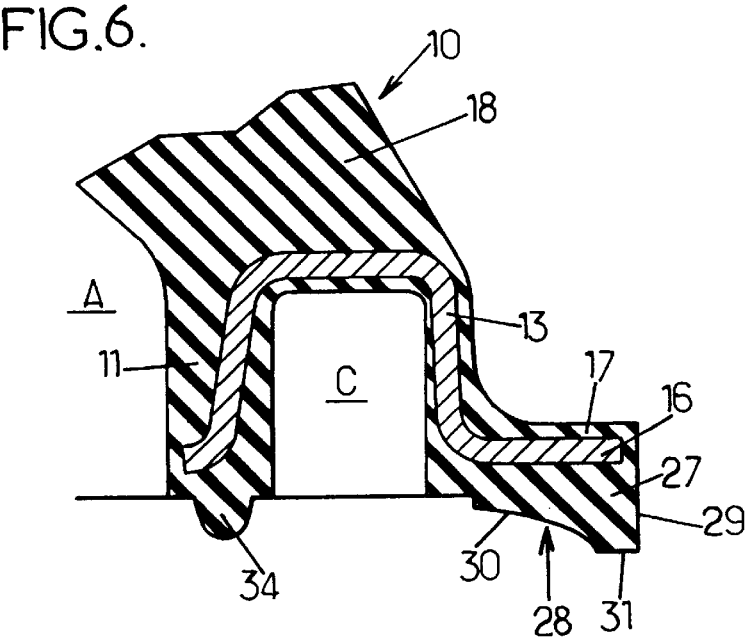
FIG. 6 is a detail section view of the elastomer body shown in FIG. 5.

Advantageously, as shown in FIG. 6, the peripheral sealing lip 27 is in the form of a solid elastomer bead having an asymmetrical V-shaped profile together with a radially inner bearing face 28 which flares downwards and a radially outer side face 29 which is substantially vertical.

The bearing face 28 of the sealing lip 27 may, for example, present both an inner pa downwal zone 30 having a downwardly flared curved profile and a plane outer zone 31 that is substantially horizontal.

In addition, the top face 12 of the plate has, on either side of its stamped central portion 5, two sloping edges 32 (see FIGS. 2 and 4) extending outwards and downwards, and on which the respective curved zones 30 of the sealing lips 27 are compressed, while the plane outer zones 31 of said sealing lips are compressed respectively against the top faces of the flanges 6.

Furthermore, the bottom face of the base 11 of the elastomer body has two elastomer beads 33 along the crimped tabs 14, which beads project towards the plate 4 and are at least partially compressed against the top faces of the rims 9 of said plate.

These two beads 33 connect with the sealing lips 27, thereby providing a peripheral sealing barrier around the entire perimeter of the base 11 of the elastomer body.

In addition, as can be seen in FIGS. 5 and 6, the base of the elastomer body is also provided with axial ribs 34 projecting downwards towards the plate 4 and which are compressed against the top face 12 of said plate during assembly of the antivibration support, said ribs 34 being disposed in such a manner as to insulate the working chamber A, the compensation chamber B, and the narrow channel C from one another except for the outlets from the narrow channel C into the working chamber A and into the compensation chamber B.

The axial shape of the ribs 34 does not disturb the operation of the antivibration support even if said ribs should tilt over to one side or the other while they are being compressed or while the antivibration support is in operation.

Even if such changes of direction of inclination along the ribs 34 might give rise to small amounts of local leakage from one chamber to the other, the liquid remains contained inside the antivibration support. In addition, the flow rate through any such leakage will be very small, and will therefore not interfere with the operation of the antivibration support.

Furthermore, in order to further limit the flow rate of any such leaks, it is possible to provide two sealing lips 34 parallel to each other and spaced apart level with the wall 35 of the elastomer body between the working chamber A and the compensation chamber B.

We claim:

1. A hydraulic antivibration support designed to be interposed between two rigid elements to damp vibration between these two elements essentially along a first axis, the support comprising:

first and second rigid strength members suitable for securing respectively to the two rigid elements to be united, the second strength member being constituted by a plate which extends in a mean plane perpendicular to the first axis and which has a "support" face facing towards the first strength member;

an elastomer body connecting the first strength member to the plate and having a base pressed in sealing contact against the support face of the plate merely by being clamped parallel to the first axis, said axial clamping being obtained by means of a rigid perforated insert which is embedded in the base of the elastomer body and which is held pressed against the support face of the plate by crimping, the base of the elastomer body having at its periphery firstly at least two opposite "fixing" edges along which said crimping is performed, and secondly at least two free edges interconnecting the fixing edges, the perforated insert itself having free edges which are embedded in the free edges of the base of the elastomer body and which are merely pressed axially against the support face of the plate, the elastomer body further comprising a bell-shaped thick wall which extends along the first axis which flares to the base of said elastomer body from a top secured to the first strength member and which co-operates with the support face of the plate to define at least a first hydraulic chamber filled with liquid;

a deformable second hydraulic chamber also filled with liquid; and a narrow channel which is filled with liquid, and which interconnects the first and second hydraulic chambers;

wherein the base of the elastomer body has, at its periphery and at least along each of said free edges, an outer sealing lip made of a solid bead of elastomer projecting towards the plate, said outer sealing lip having an asymmetrical V-shaped profile with an inner bearing face which flares outwards towards the support face of the plate and which is compressed against said support face of the plate, and an outer side face which is substantially perpendicular to the mean plane of the plate.

2. A hydraulic antivibration support according to claim 1, in which the support face of the plate has a raised central portion which projects towards the elastomer body and which lies between sloping edges flaring outwards going away from the first strength member, in correspondence with the free edges of the base of the elastomer body, the bearing faces of the outer sealing lips pressing respectively against the sloping edges.

3. A hydraulic antivibration support according to claim 2, in which the support face of the plate further comprises plane outer surfaces which are disposed outside said sloping edges and which extend parallel to the mean plane of the plate, each of the bearing faces of the outer sealing lips having a plane outer zone which extends parallel to the corresponding plane outer surface of the plate and which presses against said plane outer surface.

4. A hydraulic antivibration support according to claim 1, in which each of the fixing edges of the base of the elastomer body has an elastomer bead which projects towards the plate and which is at least partially compressed against the support face of said plate, the beads which correspond to the various fixing edges connecting to the various sealing lips, thereby forming a peripheral sealing barrier around the entire perimeter of the base of the elastomer body.

5. A hydraulic antivibration support according to claim 1, further including a rigid cover which covers the thick wall of the elastomer body at least in part so as to limit movement of the first strength member relative to the plate, said cover having fixing zones extending parallel to the plate and secured to said plate in the vicinity of the free edges of the base of the elastomer body, said free edges of the perforated insert and of the base of the elastomer body being clamped parallel to the first axis between the support face of the plate and said cover.

6. A hydraulic antivibration support according to claim 5, in which the base of the elastomer body has two fixing edges that are interconnected by two free edges, the cover being generally Ω-shaped and open on a second axis perpendicular to said first axis, with the two fixing flanges forming said fixing zones, and the first strength member being in the form of an elongate rigid member extending longitudinally along said second axis.

7. A hydraulic antivibration support designed to be interposed between two rigid elements to damp vibration between these two elements essentially along a first axis, the support comprising:

first and second rigid strength members suitable for securing respectively to the two rigid elements to be united, the second strength member being constituted by a plate which extends in a mean plane perpendicular to the first axis and which has a "support" face facing towards the first strength member;

an elastomer body connecting the first strength member to the plate and having a base pressed in sealing contact against the support face of the plate merely by being clamped parallel to the first axis, said axial clamping being obtained by means of a rigid perforated insert which is embedded in the base of the elastomer body and which is held pressed against the support face of the plate by crimping, the base of the elastomer body having at its periphery firstly at least two opposite "fixing" edges along which said crimping is performed, and secondly at least two free edges interconnecting the fixing edges, the perforated insert itself having free edges which are embedded in the free edges of the base of the elastomer body and which are merely pressed axially against the support face of the plate, the elastomer body further comprising a bell-shaped thick wall which extends along the first axis which flares to the base of said elastomer body from a top secured to the first strength member and which co-operates with the support face of the plate to define at least a first hydraulic chamber filled with liquid;

a deformable second hydraulic chamber also filled with liquid, and a narrow channel which is filled with liquid, and which interconnects the first and second hydraulic chambers;

wherein the base of the elastomer body has, at its periphery and at least along each of said free edges, an outer sealing lip made of elastomer projecting towards the plate and which is at least partially compressed against the support face of said plate, said outer sealing lip having a profile that is asymmetrical and not perpendicular to the support face of the plate, said profile sloping throughout in the same direction relative to said support face of the plate;

and in which the elastomer body also has a freely-deformable thin wall which co-operates with the support face of the plate to define the second hydraulic chamber, the narrow channel itself being defined between the base of the elastomer body and said support face of the plate.

8. A hydraulic antivibration support according to claim 7, in which the base of the elastomer body further has at least one intermediate sealing lip which projects towards the plate and which is compressed at least in part against the support face of said plate, thereby isolating the working chamber, the compensation chamber, and the narrow channel from one another apart from the communication between the narrow channel and said chambers.

9. A hydraulic antivibration support according to claim 8, in which the base of the elastomer body has two parallel intermediate sealing lips spaced apart from each other between the working chamber and the compensation chamber.

* * * * *